United States Patent [19]

Moriwaki

[11] 4,059,921
[45] Nov. 29, 1977

[54] PLANT POT FOR GROWING A PLANT
[75] Inventor: Takeshi Moriwaki, Sakai, Japan
[73] Assignee: Daicel Co., Ltd., Sakai, Japan
[21] Appl. No.: 697,732
[22] Filed: June 18, 1976
[30] Foreign Application Priority Data
June 21, 1975 Japan .............................. 50-85978[U]
[51] Int. Cl.² .............................................. A01G 9/02
[52] U.S. Cl. ........................................ 47/73; 206/423
[58] Field of Search ................. 47/66, 73, 78; 220/6, 220/4 F; 229/24, 41 R, 41 C; 206/423

[56] References Cited
U.S. PATENT DOCUMENTS

| 94,202 | 8/1869 | Gustafson | 47/73 |
| 499,996 | 6/1893 | Hoffman | 47/73 |
| 726,766 | 4/1903 | Schaefer | 47/73 |
| 1,542,683 | 6/1925 | Everett | 47/73 |
| 3,195,272 | 7/1965 | Mosher et al. | 47/73 |

Primary Examiner—Robert E. Bagwill
Attorney, Agent, or Firm—Wenderoth, Lind & Ponack

[57] ABSTRACT

An integrally molded plant pot for growing a plant which has a base portion and a plurality of flap portions connected to the base portion, each having a plurality of perforated penetrating holes. The base portion is surrounded by the flap portions. The flap portions are assembled by means of a clamping portion provided on a side edge thereof. The flap portions are economically designed to be molded in an injection molding machine or the like, so that they can be opened outwardly at a bending portion provided at the bottom surface of the flap portions. The pot has a strength and a flexibility sufficient to make removal of the plant therefrom easy during transplantation from the pot.

12 Claims, 7 Drawing Figures

PLANT POT FOR GROWING A PLANT

The present invention relates to a plant pot for growing a plant such as a garden plant, a sapling, a tree and the like, which is economically manufactured and is easily removable from the plant without destroying the soil in the pot and without damaging, substantially, the root hairs.

BACKGROUND OF THE INVENTION

There are general conventional methods of growing a plant. In one method, the growth of the roots is restricted but the growth of a number of root hairs is promoted to make the cultivation after transplantation better by burying the plant in the ground together with a plant pot. In this method, the pot has a number of penetrating holes and is made from a synthetic resin which is does not carrode or deteriorate in the ground. According to the cultivation method using such a plant pot, the root hairs grow through the small holes of the pot wall. When the plant is removed from the pot for transplantation, difficulty may be encountered which will cause the root hairs to cling to the small holes of the pot, and the plant cannot be removed from the pot successfully without destroying the soil near the plant. It is a disadvantage of this conventional method that, if such soil is destroyed, the root hairs which have been grown for a long time may be destroyed and/or separated from the soil in pot, the growth after transplantation is severely disturbed.

SUMMARY OF THE INVENTION

It is an object of the present invention to provide a plant pot for growing a plant, hereafter referred to as "pot", which has a base portion and a plurality of bendable flap portions surrounding the base portion. Each flap portion is integrated to form a pot and has a number of penetrating holes there through. The flap portions are held in close association with one another by a clamping portion at the upper side edge thereof, and are formed so that they bend outwardly at a bending portion on their bottom surface to make removal of the plant inside easier.

BRIEF DESCRIPTION OF THE DRAWINGS

The invention will now be described by way of example with reference to the accompanying drawing in which.

DETAILED DESCRIPTION OF THE INVENTION

Figure 1:
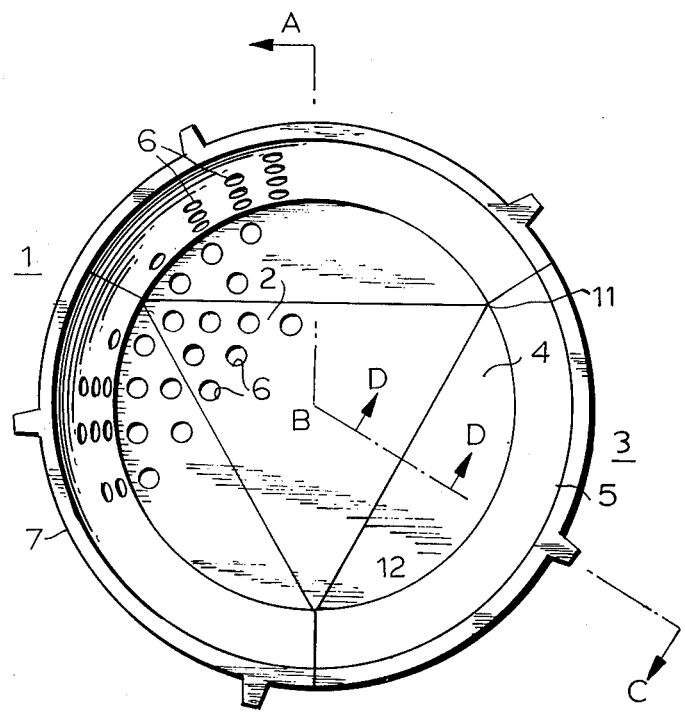
FIG. 1 shows a plan view of a plant pot embodying the invention with penetrating holes partly omitted.
Figure 2:
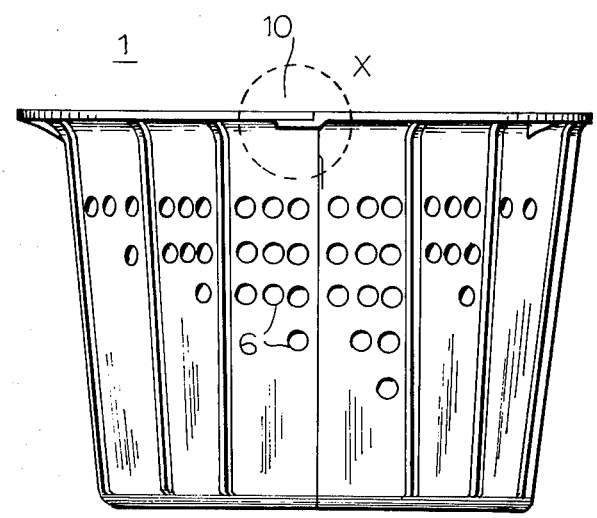
FIG. 2 is an elevational view of a plant pot of the invention with penetrating holes partly omitted.
Figure 3:
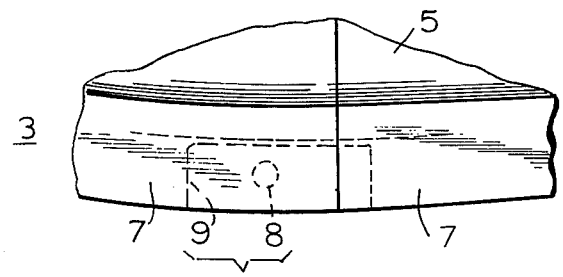
FIG. 3 is an enlarged plan view of circle x shown in FIG. 2.
Figure 4:
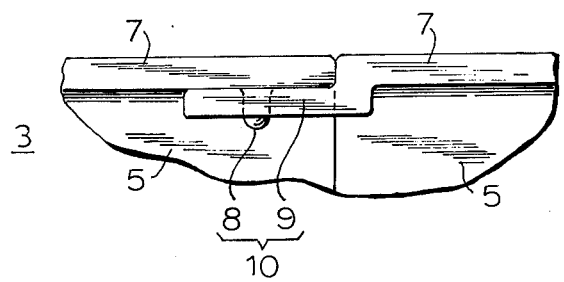
FIG. 4 shows an enlarged elevation viewed from the bottom of FIG. 3.

Referring to the drawing, FIG. 1 shows a plan view of the pot embodying the invention showing the penetrating holes 6, with some of the penetrating holes omitted. A base portion 2 and a plurality of flap portions 3 are integrally connected by means of a plurality of molded bendable portions 12 made of a combination of a plurality of a resilient non-soil-corrosive materials. The adjacent flap portions 3 are assembled into and held in a pot shape simply by means of a clamping portion 10 as shown in FIGS. 2, 3 and 4.

Figure 5:
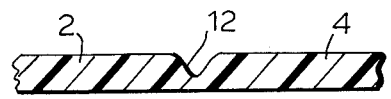
FIG. 5 is an enlarged section taken on the line D—D in FIG. 1.

Such a construction of the pot permits the pot to be strong and the function well during its use and transportation. As shown in FIGS. 1 and 5, the bendable portion 12 is simply and preferably made of; a continuously curved channel in the shape of a U or V projecting toward the inside of the pot, but it is not limited thereto; an array of penetrating holes; and/or unpenetrating holes or (a) discontinuous channel similar to that above. Or the bendable portion may be any suitable combination of of these features. The flap portions 3 have a flap bottom portion 4, connected integrally with the base 2 by means of a bendable portion 12, a flap side portion 5 and a fringe portion 7 at the top of the flap side portion 5.

The penetrating holes 6 may be in any shape and are perforated in large number in the base portion 2, the flap bottom portion 4, and the flap side portion 5. If the penetrating holes are circular, the diameter of the penetrating holes are preferably about 3 to 10 mm, of course depending upon the dimension of the pot. The following equation (1) is the most preferable for the root regulation effect, $$a \cdot n/A \times 100 \geqq 20\% \qquad (1)$$

where A is the inside area of the pot 1 invention in mm$^2$; a is the area of penetrating holes 6 in mm$^2$; and n is the number of penetrating holes. The penetrating holes are preferably arranged as homogeneously as possible around the surface of the pot 1 corresponding to the root portion of the plant 15.

The penetrating holes, at least those arranged through the flap side portion 5 are preferably formed at an angle to the side through which they penetrate to provide a releasing taper, so that the molded pot can easily be released from the injection molding machine in which it is formed.

Figure 6:
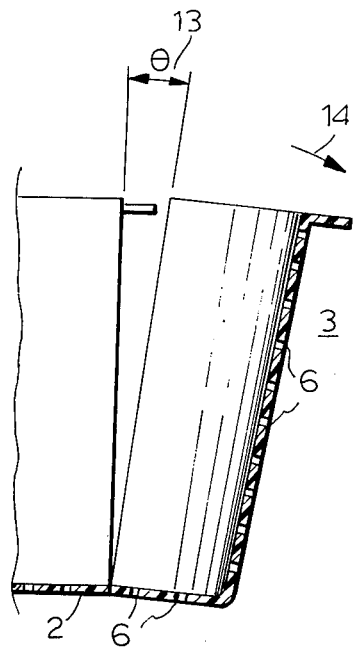
FIG. 6 is a section taken on the line B-C in the FIG. 1, showing the conditions during the molding operation of the invention.

The plant pot is economical to produce because of the moldability at a stroke with an injection molding machine. The pot should generally be formed at an open angle 13 as shown in FIG. 6 during the injection molding to facilitate the necessary molding of a dividing edge 11 and a clamping portion 10, and particularly, a perforated portion 9.

An opening angle 13 is of 6 degrees as shown in the embodiment shown of FIGS. 1 to 5 may be sufficient, however, the angle may vary depending on the design of the pot.

To release the pot from the mold after the molding is carried out, the side flaps are moved in the direction of arrow 14.

The clamping portion 10 of the edge portion 7 of the flap portion 3 comprises a projection 8 and a perforation or hole 9 as shown in FIGS. 2 to 4, such as the generally known hook-type, or it may be any other type of clamp if the molding and releasing are practicable.

The material for the pot 1 is preferably a bendable, for bending at the bending portion 12, noncorrosive, resilient synthetic resin such as: soft polyvinyl chloride, polypropylene, polyamide, polyurethane and polyvinyl acetate, a synthetic and natural rubber vulcanized for proper hardness, or a mixture of two or more of the above mentioned miscible substances with or without an additive, if the additive is required, for use in an injection molding machine.

Figure 7:
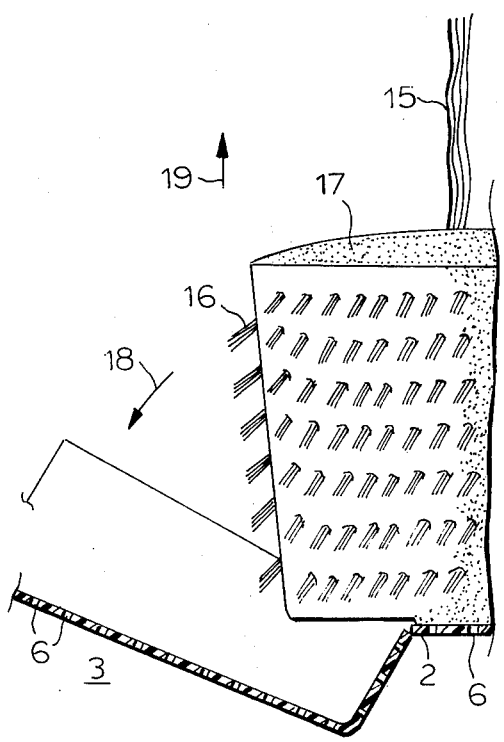
FIG. 7 is a section taken on the line A-B in FIG. 1, showing the removal of a plant together with the soil in the pot from the pot after substantial root growth.

To use the plant pot 1 of this invention for garden plant, a sapling or any other trees, the plant is planted in the usual manner in the plant pot in the assembled form as shown in FIGS. 1 and 2. Thereafter, the pot 1 is buried in the ground simply as it is. When the plant grows to a size suitable for transplanting the plant pot 1 with the grown plant therein is dug out the ground and is transported to the place of transplantation. Then, the clamping portion 10 of the pot is released or a binding rope (not shown) is unbound to deploy the flap portions radially as shown in FIG. 7, and the plant 15 together with the contained soil 17 can be removed in the direction of arrow 19.

The foregoing clearly demonstrates that the plant pot 1 not only can be manufactured economically, but also, since the strength and function are satisfactory for transplantation, has a good performance and good growth of the transplanted plant as a garden plant, a sapling, a tree and the like.

What is claimed is:

1. A pot for growing and transplanting plants comprising:
   an inner base portion having a plurality of holes therethrough;
   a plurality of flap portions adjacent each other flexibly connected to said inner base portion and having a plurality of holes therethrough, each flap portion comprised of:
   a flat outer base portion flexibly connected to said base portion and having a plurality of holes therethrough, and
   a side portion projecting upward from said flat outer base portion and having a plurality of holes therethrough, and
   said flexible connection permitting said flap portions to be flexed outwardly for transplanting; and
   clamping means on said flap portions for holding said flap portions together in a closed position for growing said plant, said inner and outer base portions being coplanar when said pot is in said closed position.

2. A pot as claimed in claim 1, wherein said side portion is integrally formed with said flat outer base portion.

3. A pot as claimed in claim 1, wherein the relationship between the solid surface area of said pot and the area of said holes through said pot is defined by the equation:

$$(a)(n)/A \times 100\% \geqq 20\%$$

where:
"A" is total inside area of said pot in mm$^2$,
"a" is the total are of each hole in mm$^2$, and
"n" is the total numbers of holes,
and wherein the diameter of each hole is from 3 – 10 mm.

4. A pot as claimed in claim 1 wherein said holes through said side portions pass therethrough at an angle relative thereto.

5. A pot as claimed in claim 1, wherein said outer base portion is flexibly connected to said inner base portion by a continuous flexible U-shaped channel projecting upward toward the inside of said pot.

6. A pot as claimed in claim 1, wherein said outer base portion is flexibly connected to said inner base portion by a continuous flexible V-shaped channel projecting upward toward the inside of said pot.

7. A pot as claimed in claim 1 wherein said outer base portion is flexibly connected to said inner base portion by a discontinuous flexible U-shaped channel projecting upward toward the inside of said pot.

8. A pot as claimed in claim 1 wherein said outer base portion is flexibly connected to said inner base portion by a discontinuous flexible V-shaped channel projecting upward toward the inside of said pot.

9. A pot as claimed in claim 1 wherein said outer base portion and said inner base portion are integrally formed and said flexible connection between said portions is comprised of a series of perforations through the material integrally forming said outer base and side portions between said portions.

10. A pot as claimed in claim 1 wherein each side portion has an edge portion integrally formed therewith, said edge portion having a hole therethrough, and said clamping means is comprised of a projection formed on each edge portion engageable in said hole through said edge portion of the side portion adjacent thereto.

11. A pot as claimed in claim 1 wherein said pot is comprised of flexible material selected from the group consisting of:
   a non-corrosive, resilient synthetic resin selected from the group consisting of soft polyvinyl chloride, polypropylene, polyamide, polyurethane and polyvinyl acetate;
   a synthetic rubber; a natural rubber; or
   a mixture of the above substances.

12. A pot as claimed in claim 1 wherein said pot is comprised of flexible material selected from the group consisting of:
   a non-corrosive, resilient syntehtic resin selected from the group consisting of soft polyvinyl chloride, polypropylene, polyamide, polyurethane and polyvinyl acetate;
   a synthetic rubber; a natural rubber; or
   a mixture of the above substances and an injection molding additive, whereby said material mixture may be used in an injection molding process.

* * * * *